(12) United States Patent
Tajima

(10) Patent No.: US 7,101,636 B2
(45) Date of Patent: Sep. 5, 2006

(54) FUEL CELL SYSTEM

(75) Inventor: Osamu Tajima, Osaka-fu (JP)

(73) Assignee: Sanyo Electric Co., Ltd., Osaka (JP)

( * ) Notice: Subject to any disclaimer, the term of this patent is extended or adjusted under 35 U.S.C. 154(b) by 526 days.

(21) Appl. No.: 10/088,497

(22) PCT Filed: Aug. 7, 2001

(86) PCT No.: PCT/JP01/06792

§ 371 (c)(1),
(2), (4) Date: Mar. 28, 2002

(87) PCT Pub. No.: WO02/15315

PCT Pub. Date: Feb. 21, 2002

(65) Prior Publication Data

US 2003/0064270 A1    Apr. 3, 2003

(30) Foreign Application Priority Data

Aug. 10, 2000    (JP)    ............... 2000-242555

(51) Int. Cl.
*H01M 8/04* (2006.01)
(52) U.S. Cl. ................................. 429/22; 429/19
(58) Field of Classification Search ............. 429/12, 429/17, 19, 22, 26, 34
See application file for complete search history.

(56) References Cited

U.S. PATENT DOCUMENTS 5,443,041 A * 8/1995 Folsom et al. ............... 122/379
5,985,474 A * 11/1999 Chen et al. ................... 429/17
6,316,134 B1 * 11/2001 Cownden et al. ............. 429/19
6,638,655 B1 * 10/2003 Gyoten et al. ................ 429/26

FOREIGN PATENT DOCUMENTS

| DE | 3932217 A1 | 10/1990 |
| JP | 40-5557 Y1 | 2/1965 |
| JP | 60-54177 A | 3/1985 |
| JP | 06-296817 | * 10/1994 |
| JP | 6-333583 A | 12/1994 |
| JP | 9-180744 A | 7/1997 |
| JP | 11-67644 A | 3/1999 |
| JP | 2000-189739 | * 7/2000 |
| JP | 2000-331703 | 11/2000 |

* cited by examiner

*Primary Examiner*—Jonathan Crepeau
(74) *Attorney, Agent, or Firm*—Westerman, Hattori, Daniels & Adrian, LLP.

(57) ABSTRACT

As the fuel cell apparatus of the present invention comprises a fuel cell for generating electricity by supplying a fuel pole with fuel gas and an oxidant pole with air, a washing liquid tank, disposed in a supply passage of the air, for reserving washing liquid, and a means for replacing the washing liquid reserved in said washing liquid tank, can supply the oxidant pole with air washed with the washing liquid, and replace the washing liquid periodically, allowing to supply the oxidant pole with always clean air. As it can supply the oxidant pole with clean reaction air not containing dust of inorganic or organic substance, volatile components of aromatics or paints, CO, NOx, SOx, cyanides, sulfates, aromatic compounds, ammonium or the other harmful substances exerting bad effects on the cell characteristics and prevent the alteration of electrolyte based on the chemical reaction between harmful substance and electrolyte, the reliability is high, the life is long life and the durability is high.

2 Claims, 6 Drawing Sheets

FUEL CELL SYSTEM

FIELD OF THE INVENTION

The present invention concerns a fuel cell apparatus, and more particularly a fuel cell apparatus allowing to supply a reaction air free from a trace of harmful substance contained in the reaction air.

BACKGROUND ART

An example of conventional fuel cell system is shown in FIG. 6. In the system, a desulfurizer 2 is supplied with a raw fuel 1 such as natural gas, town gas, methanol, LPG, butane or the like, and here the raw fuel is desulfurized. The raw material having passed through the desulfurizer is pressurized by a pressure pump 10, and supplied to a reformer 3, to generate a reformed gas containing hydrogen, carbon dioxide and carbon monoxide. The gas having passed through the reformer 3 is supplied to a CO transformer 4 and, here, carbon monoxide contained in the reformed gas is transformed into carbon dioxide. The gas having passed through the CO transformer 4 is supplied to a CO remover 5 and, here, non transformed carbon monoxide contained in the gas having passed through the CO transformer 4 is removed.

Hydrogen rich reformed gas after the removal of carbon monoxide having passed through the CO remover 5 is supplied to a fuel cell 6. The fuel cell 6 comprises a fuel pole 6a, an oxidizer pole 6b and a cooling portion 6c and the aforementioned hydrogen is supplied to the fuel pole 6a. The hydrogen reacts with oxygen contained in the air supplied into a water tank 21 through a fan 11, humidified and then supplied to the oxidizer pole 6b, generating electricity.

For instance, when the fuel cell 6 uses a solid polymer electrolyte film, the solid polymer electrolyte film is humidified with moisture contained in the humidified air supplied to the oxidant pole 6b, for improving the ion electric conductivity.

The reformer 3 includes a burner 12 which is supplied with raw fuel through a pipe 13, supplied with air through a fan. 14 and supplied with non reacted hydrogen having passed the fuel pole 6a, through the pipe 15. When the system is started, the burner 12 is supplied with raw fuel through the pipe 13 and, at the same time, supplied with air through the fan 14 and, after the start, in case where the system stabilizes, the raw fuel supply is cut and the burner 12 is supplied with non reacted hydrogen having passed the fuel pole 6a, through the pipe 15.

Chemical reactions having a predetermined reaction temperature take place in the aforementioned reformer 3, CO transformer 4, CO remover 5 and fuel cell 6. The chemical reaction in the reformer 3 being endothermic, the chemical reaction is performed all the way heating with the burner 12.

The chemical reaction taking place in the CO transformer 4 and CO remover 5 being exothermic, for instance in the CO remover 5, combustion gas is generated by burning a not shown burner only during the system start, the temperature of the CO remover 5 is heated to the reaction temperature by the heat of the combustion gas generated at this moment, and during the operation, it is cooled so that the temperature does not elevated to the reaction temperature or higher by the heat of the exothermic reaction.

Each heat exchanger 18, 19 and 20 is connected respectively between the aforementioned reformer 3 and CO transformer 4, between CO transformer 4 and CO remover 5, and between CO remover 5 and fuel cell 6.

Water from a water tank 21 circulates through respective heat exchangers 18, 19, 20 through pumps 23, 24, 25 and the gas having passed through the reformer 3, CO transformer 4, CO remover 5 is cooled respectively by these waters.

Water from the water tank 21 circulates through the cooler section 6c of the fuel cell 6 through a pump 48, and the fuel cell 6 is cooled with the water. 26 indicates an exhaust system of the oxidant pole 6b of the fuel cell 6.

A heat exchanger 17 is connected to an exhaust system 31 of the aforementioned reformer 3, and when the water of the water tank 21 is supplied through a pump 22, it becomes moisture vapor in the heat exchanger 17, and the moisture vapor is mixed with the raw material and supplied to the reformer 3.

In the aforementioned conventional system S, air (the atmosphere air) around the fuel cell is supplied to the water tank 21 through the fan 11, humidified and supplied to the oxidant pole 6b as reaction air. Consequently, a trace of NOx, SOx, cyanides, sulfates, aromatics, ammonium, organic solvents or the other impurities exerting bad effects on the cell characteristics contained in the air (the atmosphere air) is once removed by the water reserved in the water tank 21. However, when the operation time is prolonged, the concentration of impurities in the water increases, and impurities in the air passing through the water tank 21 are not removed no more, for supplying the oxidant pole 6 with air containing impurities as reaction air.

The aforementioned impurities contained in the reaction air arrive at the electrode catalyst layer permeating through the electrode medium with oxygen in the air, come into contact with the electrolyte and provoke a chemical reaction, and the chemical reaction alter the electrolyte and deteriorate functions as electrolyte and, at the same time, inhibit the oxygen absorbing function of the electrode catalyst, and these causes provoke problems such as deterioration of cell characteristics or life characteristics of the fuel cell.

Besides, problems of bad effects due to the impurities contained in such reaction air were not limited to a fuel cell using the solid polymer electrolyte film, but encountered similarly in the other fuel cells such as phosphoric acid type fuel cell.

The present invention has an object of solving conventional problems, preventing cell characteristics and life characteristics of a fuel cell from lowering by composing to supply the oxidant pole 6b of the fuel cell 6 with reaction air, preliminarily removing a trace of inorganic and organic dust, aromatics, volatile components of paint, CO, NOx, SOx, cyanides, sulfates, aromatic compounds, ammonium or the other harmful substances exerting bad effects on the cell characteristics contained in the air (the atmosphere air), and providing a fuel cell apparatus of high reliability, long life and high durability.

DISCLOSURE OF THE INVENTION

In order to solve the aforementioned problem, the fuel cell apparatus is characterized by comprising a fuel cell for generating electricity by supplying a fuel pole with fuel gas and an oxidant pole with air, a washing liquid tank, disposed in a supply passage of the air, for reserving washing liquid, and a means for replacing the washing liquid reserved in the washing liquid tank.

The oxidant pole can be supplied with always clean air by supplying the oxidant pole with air washed with the washing liquid in the washing liquid tank, disposed in the air supply passage, and by replacing washing liquid.

The fuel cell apparatus is the fuel cell apparatus wherein the washing liquid is water, or a washing liquid of organic compound.

The use of water or washing liquid of organic compound as washing liquid allows to remove impurities in the air.

The fuel cell apparatus is the fuel cell apparatus wherein the washing liquid tanks are disposed in plurality in series on the air supply passage, and comprise a means for replacing periodically at least washing liquid reserved in a washing liquid tank arranged upstream.

The use of a plurality of stages of washing liquid tank for cleaning the air allows to plan a further air purification. Particularly, a combination of a washing liquid tank using water and a washing liquid tank using washing liquid of organic compound allows to remove a variety of impurities. In addition, in case of using such a plurality of stages of washing liquid tank, the replacement of washing liquid is effective only by executing at least for the washing liquid tank arranged upstream.

The fuel cell apparatus is the fuel cell apparatus wherein a plurality of washing liquid tanks reserving the same washing liquid are disposed differently from each other in the liquid level, and a lower washing liquid tank is supplied with washing liquid from an upper washing liquid tank by the level difference.

The level difference of both tanks allows to supply easily the lower washing liquid tank with water from the upper washing liquid tank.

The fuel cell apparatus is the fuel cell apparatus wherein the water to be supplied to a washing liquid tank using water as washing liquid, is a water treated water.

The water to be supplied to the washing liquid tank is preferably a water from which dust or the other impurities are removed by the water treatment and further, a water from which harmful substances exerting bad effects to the cell characteristics are eliminated is more preferably, and particularly, a pure water obtained by the water treatment is preferably.

The fuel cell apparatus of is characterized by comprising a fuel cell for generating electricity by supplying a fuel pole with fuel gas and an oxidant pole with air, a water tank for reserving cooling water of the fuel cell, a washing liquid tank, disposed in a supply passage of the air, for reserving washing liquid, and a means for replacing the washing liquid reserved in the washing liquid tank.

The fuel cell apparatus is the fuel cell apparatus wherein the means for replacing washing liquid is operated every fixed time.

The fuel cell apparatus is the fuel cell apparatus wherein the means for replacing washing liquid is operated according to the dirtiness of washing liquid.

The fuel cell apparatus is the fuel cell apparatus comprising a means for supplying the washing tank with water of the watertank.

The fuel cell apparatus is the fuel cell apparatus wherein the air is supplied to the oxidant pole, after impurities in the air in the washing liquid tank is removed, and the air is humidified in the water tank.

BRIEF DESCRIPTION OF THE DRAWINGS

In FIG. 1 to FIG. 5, the same components as the related art showing FIG. 6 are indicated by the same reference for omitting a duplicate description.

BEST MODE FOR CARRYING OUT THE INVENTION

Now, embodiments of the present invention will be described in detail referring to drawings.

Figure 1:
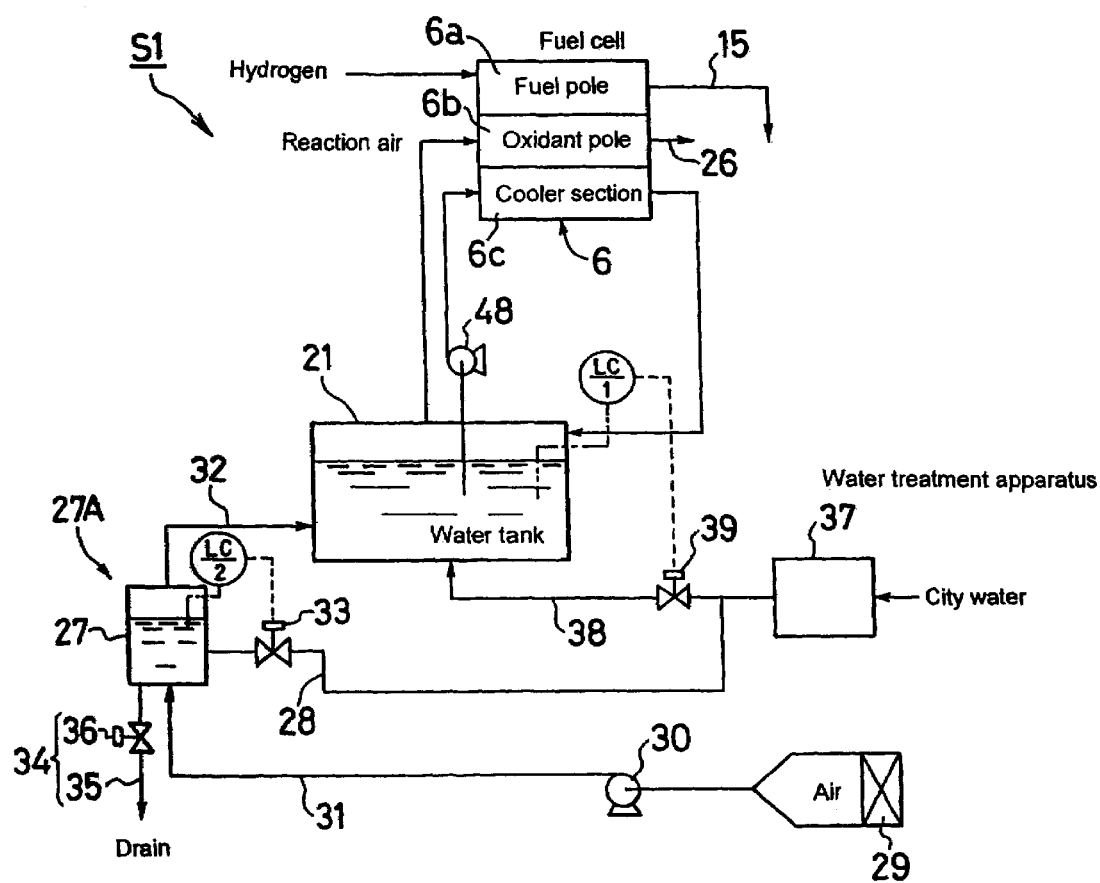
FIG. 1 is a composition diagram showing a first embodiment of the fuel cell apparatus of the present invention.

In a system S1 of a fuel cell apparatus shown in FIG. 1, a fuel cell 6 comprises a reaction air washing means 27A for removing harmful substances in the reaction air by washing with water.

The reaction air washing means 27A comprises a washing liquid tank 27 containing water for washing, a water supply passage 28 for supplying a washing liquid tank 27 with water obtained by treating city water by a water treatment apparatus 37, an air supply passage 31 for taking air (the atmosphere air) by a pump 30 through a filter 29 and supplying to the washing liquid tank 27, a washing air supply passage 32 for supplying a water tank (washing liquid tank reserving water as washing liquid. Called water tank, hereinafter) 21 for humidifying an air from which harmful substances are removed by washing the air with water as washing liquid in the washing liquid tank 27, and a discharge means 34 for discharging periodically water as washing liquid contained in the washing liquid tank 27.

The means 34 for discharging periodically water comprises a discharge passage 35 and an on-off valve 36, for discharge, installed on the discharge passage 35.

38 is a passage for supplying the water tank 21 with water obtained by treating city water by the water treatment apparatus 37, and LC/1 is a level controller installed in the water tank 21 for opening/closing the on-off valve 39 installed on the passage 38 so as to maintain the level of water contained in the water tank 21 to a predetermined level.

LC/2 is a level controller installed in the washing tank 27 for opening/closing an on-off valve 33 installed on the water supply passage 28 so as to maintain the level of water for washing contained in the washing water tank 27 to a predetermined level.

When the system S1 of the fuel cell apparatus of the aforementioned configuration is operated, the water tank 21 and the washing liquid tank 27 respectively are supplied with a predetermined quantity of water (for instance, pure water) obtained by treating city water by the water treatment apparatus 37 through the passage 38 and the water supply passage 28.

On the other hand, air (the atmosphere air) taken in by the pump 30 and from which dusts or the like are remove through the filter 29 is supplied to the washing liquid tank 27 through the air supply passage 31. Then, the water supplied to the washing liquid tank 27 is made into contact, mixed and washed sufficiently with the water for washing contained in the washing liquid tank 27 for removing harmful substances.

Thus, the air from which a trace of NOx, SOx, cyanides, sulfates, aromatics, ammonium or the other harmful substances exerting bad effects on the cell characteristics contained in the air is eliminated is supplied to the water tank 21 through the washing air supply passage 32 to be humidified. The air humidified in the water tank 21 is supplied to the oxidant pole 6b of the fuel cell 6 as reaction air. As it is so configured to supply the oxidant pole 6b of the fuel cell 6 with a clean reaction air free from harmful substance, the alteration of electrolyte based on the chemical reaction between harmful substance and electrolyte, and the decrease of oxygen absorbing ability of the electrode catalyst can be prevented, and the decrease of cell characteristics caused by them can be avoided.

Water contained in the washing liquid tank 27 used for removing harmful substances by washing the air is discharged periodically (for instance, according to a calendar day and hour, or when the power generation attains a predetermined value, or when the power generation time attains a predetermined value, or when the system operation time attains a predetermined value, or when the dirt detected by an electric conductivity sensor or the like becomes equal or superior to a predetermined value) by opening the on-off valve 36 automatically or manually.

As it is so configured to supply the washing liquid tank 27 with fresh water, after the discharge, harmful substances can be removed always continuously and easily in the washing liquid tank 27, and the air containing harmful substance is limited and prevented from being supplied to the oxidant pole 6b of the fuel cell 6 through the water tank 21.

Figure 2:
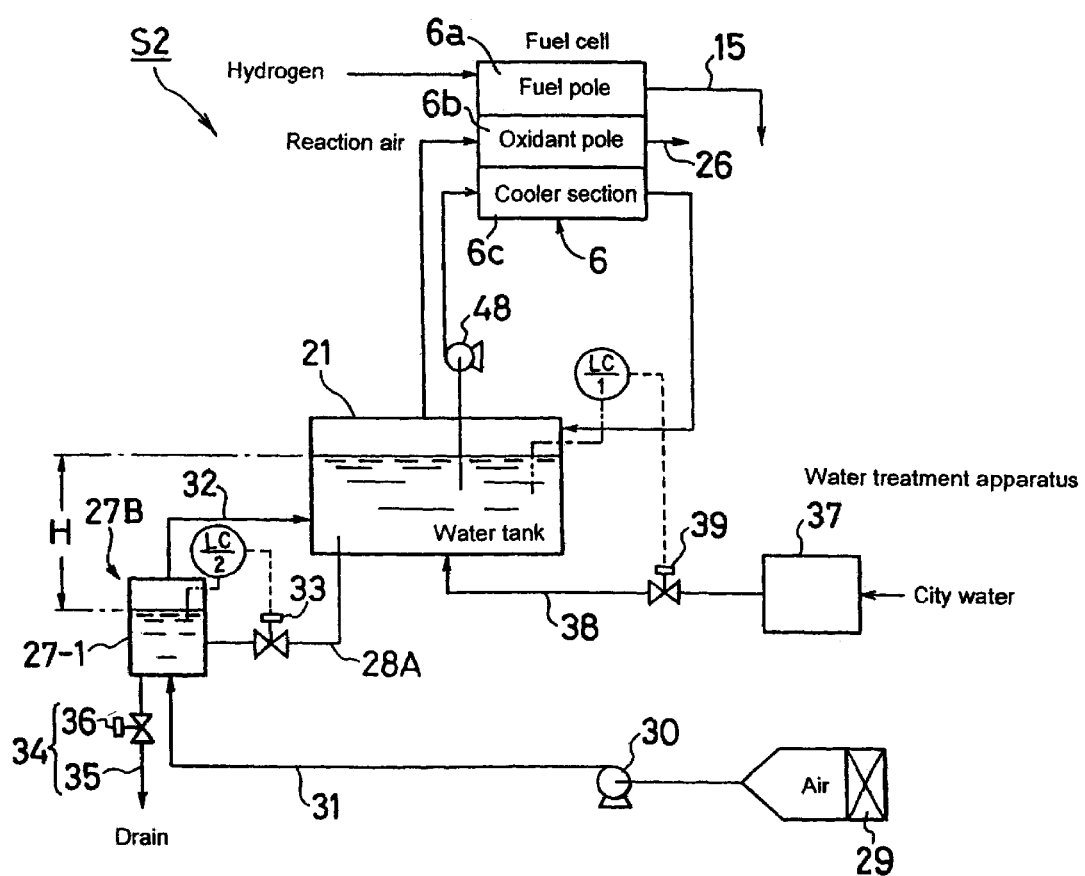
FIG. 2 is a composition diagram showing a second embodiment of the fuel cell apparatus of the present invention.

FIG. 2 is a composition diagram showing a second embodiment of the fuel cell apparatus of the present invention.

In a system S2 of a fuel cell apparatus, a fuel cell 6 comprises a reaction air washing means 27B for removing harmful substances in the reaction air by washing with water. The reaction air washing means 27B is similar to the reaction air washing means 27A of the system S1 of the fuel cell apparatus shown in FIG. 1, except that the washing liquid tank 27-1 is installed lower than the water tank 21 so that the washing liquid tank 27-1 is supplied with water from the water tank 21 by the level difference H between both tanks.

Consequently, the reaction air washing means 27B has the same functional effects as the reaction air washing means 27A of the system S1 of the fuel cell apparatus shown in FIG. 1 and moreover, as the washing liquid tank 27-1 is installed lower than the water tank 21, the washing liquid tank 27-1 can be supplied with water from the water tank 21 by the level difference H between both tanks.

Figure 3:
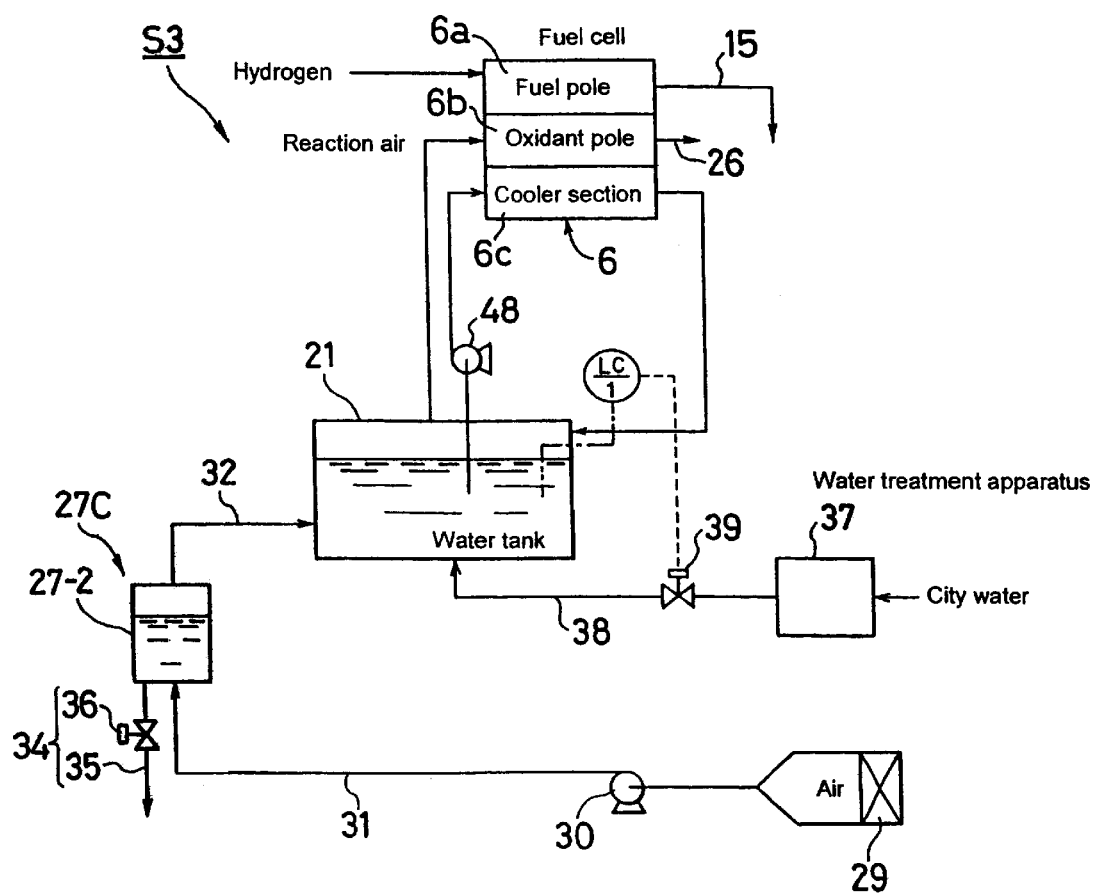
FIG. 3 is a composition diagram showing a third embodiment of the fuel cell apparatus of the present invention.

FIG. 3 is a composition diagram showing a third embodiment of the fuel cell apparatus of the present invention. The fuel cell 6 in the system S3 of the fuel cell apparatus comprises a reaction air washing means 27C for removing harmful substance in the reaction air by washing with washing liquid other than water.

Washing liquids other than water used in the present invention are not particularly limited; however, to be more specific, organic compounds such as hydrocarbons, alcohols or the like can be cited, and as washing liquid that can wash and remove well NOx, SOx or the like, for example, washing liquid obtained by dissolving sodium tungstate or molybdate in water or organic medium and adding as necessary urea aldehyde to the same or the others can be cited.

The reaction air washing means 27C is similar to the reaction air washing means 27A of the system S1 of the fuel cell apparatus shown in FIG. 1, except that washing liquid other than water for removing harmful substance in the reaction air is contained in the washing liquid tank 27-2, and a trace of harmful substances contained in the air is removed by introducing air in the washing liquid tank 27-2.

Consequently, the reaction air washing means 27C has the same functional effects as the reaction air washing means 27A of the system S1 of the fuel cell apparatus shown in FIG. 1 and moreover, harmful substances that can not be washed out with water can be eliminated by making air into contact and mixed with washing liquid other than water in the washing liquid tank 27-2 containing the washing liquid other than water.

Figure 4:
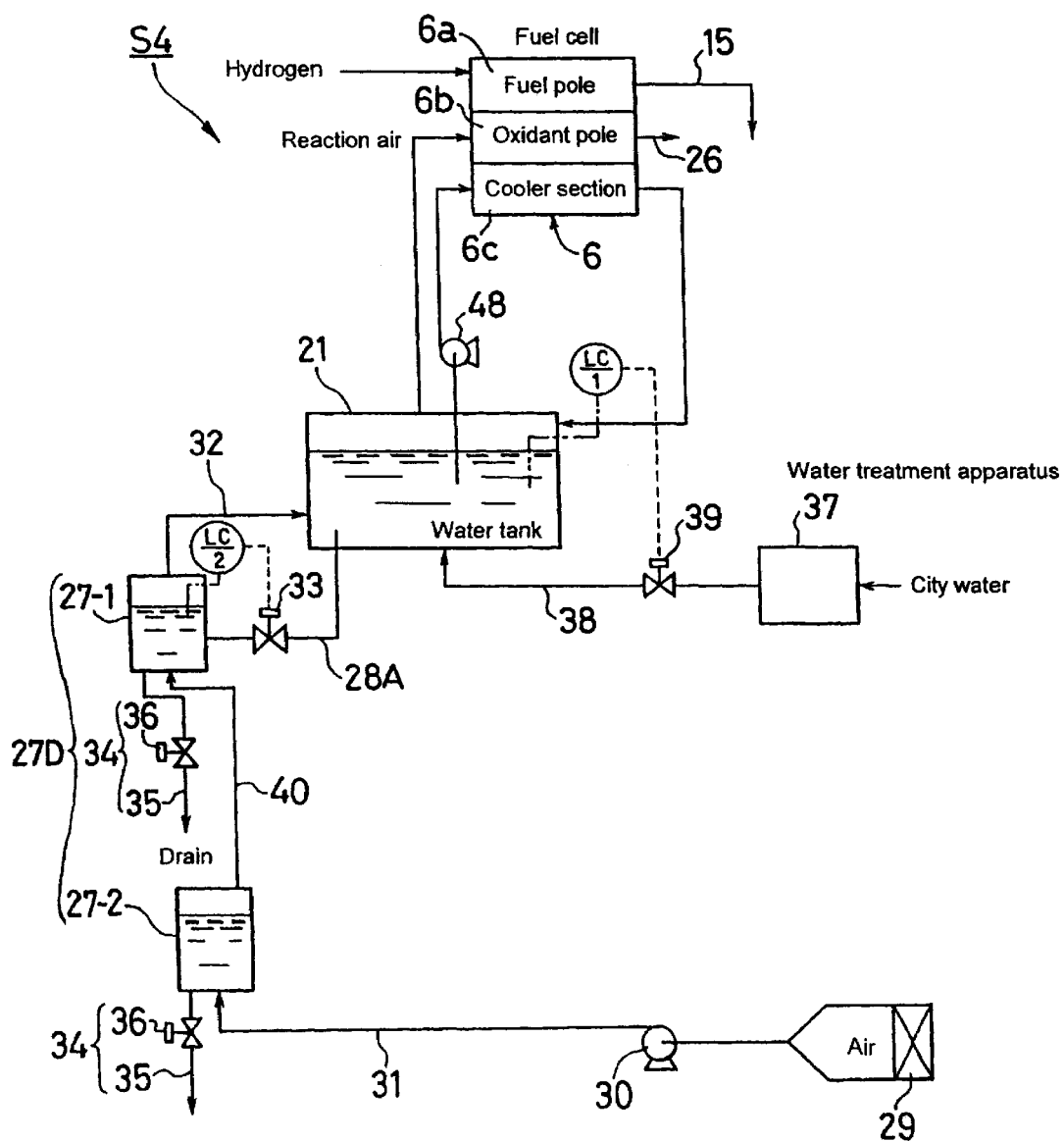
FIG. 4 is a composition diagram showing a fourth embodiment of the fuel cell apparatus of the present invention.

FIG. 4 is a composition diagram showing a fourth embodiment of the fuel cell apparatus of the present invention. The fuel cell 6 of a system S4 of the fuel cell apparatus is similar to the reaction air washing means 27B, 27C of the system S2, S3 of the fuel cell apparatus shown in FIG. 2 and FIG. 3, except that it comprises a reaction air washing means 27D composed by coupling the washing liquid tank 27-1 shown in FIG. 2 and the washing liquid tank 27-2 shown in FIG. 3 in series.

Consequently, the reaction air washing means 27D has the same functional effects as the reaction air washing means 27B, 27C shown in FIG. 2, FIG. 3 and moreover, as the trace of harmful substances contained in the air (the atmosphere air) that can not be washed out with water is eliminated first in the washing liquid tank 27-2 containing washing liquid other than water in the first stage and then, in the second stage, the washing liquid tank 27-1 containing a water is supplied with the air through the passage, harmful substances are removed sufficiently by washing again with the water, the air from which harmful substances are removed sufficiently is supplied to the water tank 21 and humidified, and the oxidant pole 6b of the fuel cell 6 is supplied with humidified air as reaction water, the alteration of electrolyte based on the chemical reaction between harmful substance and electrolyte and the decrease of oxygen absorbing ability of the electrode catalyst can further be prevented, and the decrease of cell characteristics caused by them can be avoided.

Figure 5:
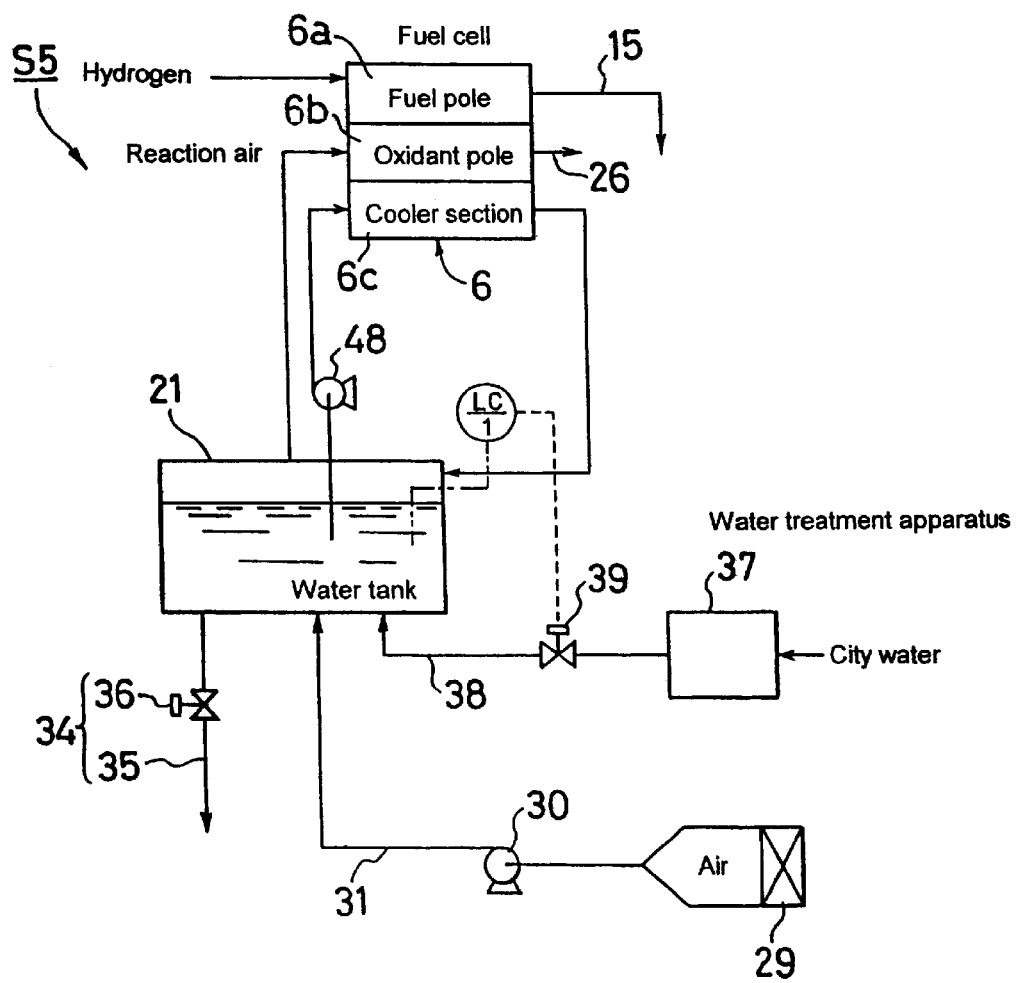
FIG. 5 is a composition diagram showing a fifth embodiment of the fuel cell apparatus of the present invention.
Figure 6:
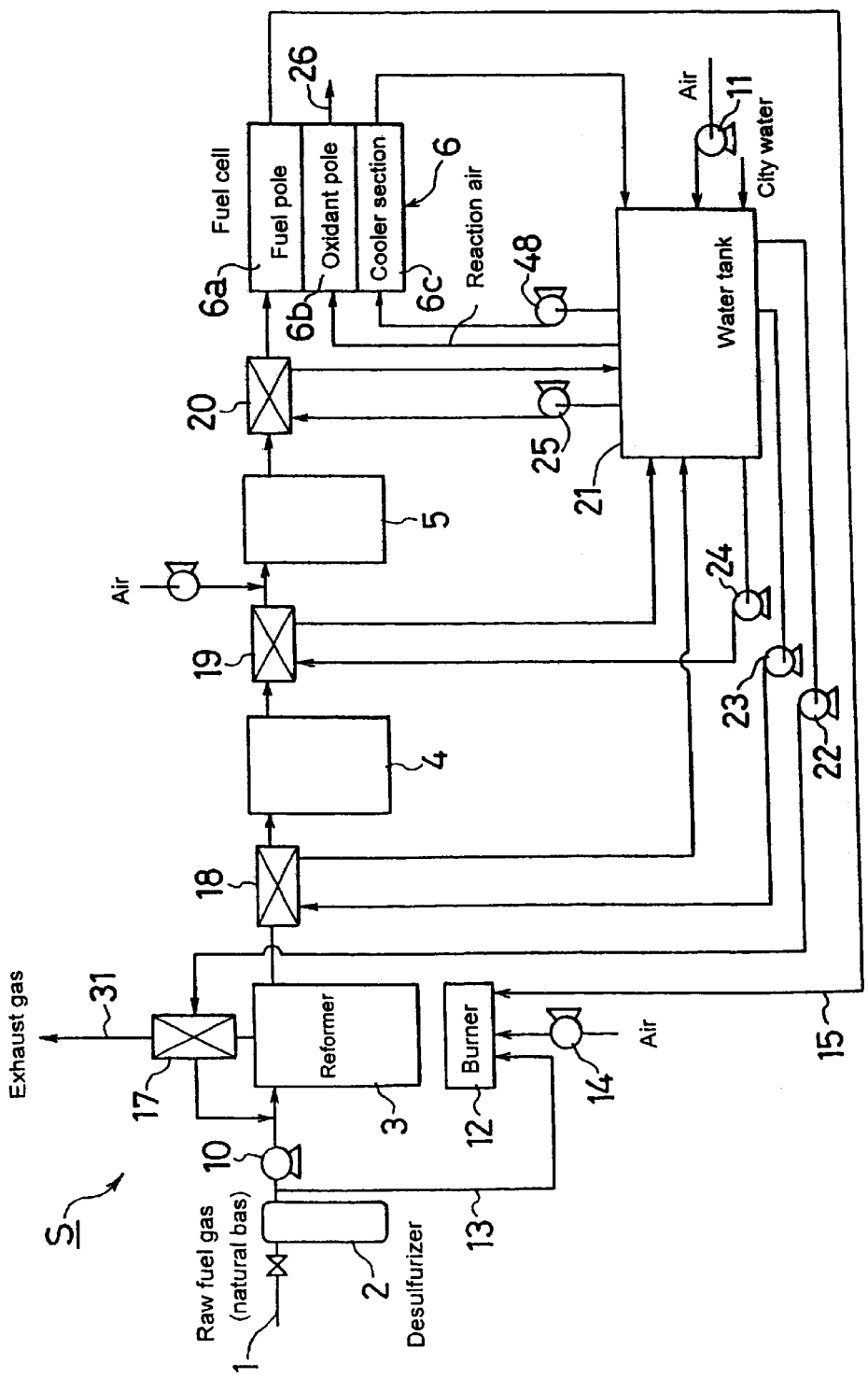

FIG. 5 is a composition diagram showing a fifth embodiment of the fuel cell apparatus of the present invention. The system S5 of the fuel cell apparatus is similar to the system S1 of the fuel cell apparatus shown in FIG. 1, except that the water tank 21 is supplied with water by water treating city water by the water treatment apparatus 37 through the passage 38, air (the atmosphere air) is taken by a pump 30 through a filter 29 and supplied directly to the water tank 21 through an air supply passage 31, and a means for discharging periodically water as washing liquid contained in the water tank 21 is disposed.

The water tank 21 is supplied with a predetermined quantity of water (for example, pure water) by water treating city water by the water treatment apparatus 37 through the passage, and maintained to a predetermined level.

On the other hand, air (the atmosphere air) taken by the pump 30 and from which dust or the like are remove through the filter 29 is supplied to the water tank 21 through the air supply passage 31. Then, the water supplied to the water tank 21 is made into contact, mixed and washed sufficiently with the water for removing harmful substances.

Thus, air from which a trace of harmful substances contained in the air is eliminated, and humidified can be supplied to the oxidant pole 6b of the fuel cell 6 as reaction air.

Water contained in the water tank 21 used for washing the air is discharged periodically by opening the on-off valve 36 for water discharge automatically or manually.

As it is so configured to supply the water tank 21 with fresh water, after the discharge, harmful substances can be removed always continuously and easily in the water tank 21, and air containing harmful substance is limited and prevented from being supplied to the oxidant pole 6b of the fuel cell 6 through the water tank 21.

Though water is used as washing liquid in the water tank 21, for the aforementioned embodiment shown in FIG. 5, the washing liquid is not limited to the water, but the other washing liquids may also be used, and for example, organic compounds may be used.

The description of the aforementioned embodiments intends to explain the present invention and not to restrict the invention described in claims, nor reduce the scope. Besides, the composition of respective components of the present invention is not limited to the aforementioned embodiments, but can modified in a variety of ways without departing from the technical scope described in claims.

For example, the present invention is not limited to the fuel cell apparatus having a fuel cell using a solid polymer electrolyte film such as solid polymer type fuel cell or direct methanol type fuel cell, but it can also be applied to a fuel cell apparatus using the other fuel cells such as phosphoric acid type.

The fuel cell apparatus of claim 1, wherein the oxidant pole is supplied with air washed with washing liquid in the washing liquid tank disposed in the air supply passage, and the washing liquid is replaced, allows to supply the oxidant pole with always clean air not containing NOx, SOx, cyanides, sulfates, aromatics, ammonium, or the other harmful substances exerting bad effects on the cell characteristics and has an remarkable effect of improving the reliability, life and durability, as the alteration of electrolyte based on the chemical reaction between harmful substance and electrolyte and the decrease of oxygen absorbing ability of the electrode catalyst can be prevented, and the decrease of cell characteristics caused by them can be avoided.

The fuel cell apparatus of claim 2 allows to remove impurities in the air by using water or washing liquid of organic compound as washing liquid.

The fuel cell apparatus allows to plan a further air purification by using a plurality of stages of washing liquid tank for cleaning the air, and furthermore, allows to remove a variety of impurities, particularly, by a combination of washing liquid tank using water and a washing liquid tank using washing liquid of organic compound and, in addition, in case of using such a plurality of stages of washing liquid tank, the replacement of washing liquid becomes effective only by executing at least for the washing liquid tank arranged upstream.

The fuel cell apparatus has a remarkable effect of allowing to supply easily the lower washing liquid tank with water from the upper washing liquid tank, as a plurality of washing liquid tanks reserving the same washing liquid are disposed differently from each other in the liquid level, and the lower washing liquid tank is supplied with washing liquid from an upper washing liquid tank by the level difference.

The fuel cell apparatus has a remarkable effect of allowing to remove harmful substances more effectively, as the washing liquid tank is supplied with a water from which dust or the other impurities are removed, a water from which harmful substances are eliminated, or a pure water obtained by the water treatment.

The fuel cell apparatus wherein the oxidant pole is supplied with air washed with washing liquid in the washing liquid tank disposed in the air supply passage, and the washing liquid is replaced, allows to supply the oxidant pole with always clean air not containing NOx, SOx, cyanides, sulfates, aromatics, ammonium, or the other harmful substances exerting bad effects on the cell characteristics and has an remarkable effect of improving the reliability, life and durability, as the alteration of electrolyte based on the chemical reaction between harmful substance and electrolyte and the decrease of oxygen absorbing ability of the electrode catalyst can be prevented, and the decrease of cell characteristics caused by them can be avoided and furthermore, cooling the water tank using the cooling water of the water tank, and also being able to be used for humidification of reaction air to be supplied to the oxidant pole, because it comprises a water tank for reserving cooling water of the fuel cell.

The fuel cell apparatus wherein the means for replacing washing liquid is operated every fixed time has a remarkable effect of always supplying the fuel cell with a clean air free from harmful substances exerting bad effects to the cell characteristics by replacing the washing liquid every fixed time.

The fuel cell apparatus wherein the means for replacing washing liquid is operated according to the dirtiness of washing liquid has a remarkable effect of always supplying the fuel cell with a clean air free from harmful substances exerting bad effects to the cell characteristics by replacing the washing liquid before the dirt of washing liquid attains a bad level, and further improving the reliability.

The fuel cell apparatus comprising a means for supplying the washing tank with water of the water tank has a remarkable effect of using effectively water of the water tank, and allowing to intend cost down, miniaturization, or the others.

The fuel cell apparatus wherein the air is supplied to the oxidant pole, after impurities in the air in the washing liquid tank is removed, and the air is humidified in the water tank, has a remarkable effect of always supplying the fuel cell with a clean air free from harmful substances exerting bad effects to the cell characteristics and furthermore improving ion electric conductivity by humidifying the solid polymer electrolyte film with moisture contained in the air to be supplied to the oxidant pole.

Industrial Applicability

The fuel cell apparatus of the present invention, comprising a fuel cell for generating electricity by supplying a fuel pole with fuel gas and an oxidant pole with air, a washing liquid tank, disposed in a supply passage of the air, for reserving washing liquid, and a means for replacing the washing liquid reserved in the washing liquid tank, and supplying the oxidant pole with air washed with the washing liquid, and replacing the washing liquid periodically, allows to supply the oxidant pole with always clean air. As it can supply the oxidant pole with clean reaction air not containing harmful substances exerting bad effects on the cell characteristics, prevent the alteration of electrolyte based on the chemical reaction between harmful substance and electrolyte, and provide a fuel cell apparatus of high reliability, long life and high durability, its industrial utility is extremely important.

The invention claimed is:

1. A fuel cell apparatus, comprising; a fuel cell for generating electricity by supplying a fuel pole with fuel gas and an oxidant pole with air, a washing liquid tank, disposed in a supply passage of the air, for reserving washing liquid, and a means for periodically replacing the washing liquid reserved in said washing liquid tank, wherein said washing liquid tanks are disposed in plurality in series on the air supply passage, and comprises a means for replacing periodically at least the washing liquid reserved in the washing liquid tank arranged upstream.

2. The fuel cell apparatus according to claim 1, wherein a plurality of washing liquid tanks reserving the same washing liquid are disposed differently from each other in the liquid level, and a lower washing liquid tank is supplied with the washing liquid from an upper washing liquid tank by the level difference.

* * * * *